(12) United States Patent
Tenorth

(10) Patent No.: US 11,338,434 B2
(45) Date of Patent: May 24, 2022

(54) CONTROLLING PROCESS OF ROBOTS HAVING A BEHAVIOR TREE ARCHITECTURE

(71) Applicant: MAGAZINO GMBH, Munich (DE)

(72) Inventor: Moritz Tenorth, Munich (DE)

(73) Assignee: MAGAZINO GMBH, Munich (DE)

( * ) Notice: Subject to any disclaimer, the term of this patent is extended or adjusted under 35 U.S.C. 154(b) by 485 days.

(21) Appl. No.: 16/081,763

(22) PCT Filed: Feb. 24, 2017

(86) PCT No.: PCT/EP2017/054389
§ 371 (c)(1),
(2) Date: Aug. 31, 2018

(87) PCT Pub. No.: WO2017/148830
PCT Pub. Date: Sep. 8, 2017

(65) Prior Publication Data
US 2019/0086894 A1 Mar. 21, 2019

(30) Foreign Application Priority Data

Mar. 3, 2016 (EP) ..................... 16158565

(51) Int. Cl.
*B25J 9/16* (2006.01)
*G05B 19/042* (2006.01)

(52) U.S. Cl.
CPC ............ *B25J 9/163* (2013.01); *G05B 19/042* (2013.01); *G05B 19/0426* (2013.01); *G05B 2219/39107* (2013.01); *G05B 2219/39158* (2013.01); *G05B 2219/40392* (2013.01)

(58) Field of Classification Search
CPC .... B25J 9/163; G05B 19/042; G05B 19/0426; G05B 2219/39158; G05B 2219/39107; G05B 2219/40392
See application file for complete search history.

(56) References Cited

U.S. PATENT DOCUMENTS

| 2004/0153212 | A1* | 8/2004 | Profio | G06N 3/008 |
| | | | | 700/245 |
| 2005/0138544 | A1 | 6/2005 | Beck et al. | 715/513 |
| 2017/0161035 | A1* | 6/2017 | Abadi | G06F 8/443 |

FOREIGN PATENT DOCUMENTS

| CN | 103838563 A | 6/2014 | |
| CN | 105117575 A | * 12/2015 | ............ G06T 19/00 |
| CN | 105117575 A | 12/2015 | |

(Continued)

OTHER PUBLICATIONS

Machine translation of JP-2009230569-A, Oct. 2009 (Year: 2009).*

(Continued)

*Primary Examiner* — Jeff A Burke
*Assistant Examiner* — Mohamad O El Sayah
(74) *Attorney, Agent, or Firm* — Stein IP, LLC

(57) ABSTRACT

The present invention relates to a method for controlling a robot, the method including usage of a behavior tree architecture for tasks performed by the robot. The present invention also relates to a system comprising a data processing means adapted to carry out the method, wherein the system preferably comprises a robot. The present invention also relates to a use of a behavior tree architecture for programming, supervision, introspection and/or debugging.

14 Claims, 3 Drawing Sheets

(56) References Cited

FOREIGN PATENT DOCUMENTS

JP          2004-114285 A        4/2004
JP           2009230569 A    * 10/2009    ......... G06F 16/3332

OTHER PUBLICATIONS

Machine translation of CN-105117575-A, Dec. 2015 (Year: 2015).*
Towards a Unified Behavior Trees Framework for Robot Control, Alejandro Marzinotto, May 31-Jun. 7, 2014 (Year: 2014).*
Parameterizing Behavior Trees, Alexander Shoulson (Year: 2011).*
Marzinotto Alejandro et al, "Towards a unified behavior trees framework for robot control", 2014 IEEE International Conference on Robotics and Automation (ICRA), IEEE, (May 31, 2014), doi:10.1109/ICRA.2014.6907656, pp. 5420-5427, XP032650070 [X] 1-15, p. 5420-p. 5427.
Wikipedia, "Behavior tree (artificial intelligence, robotics and control)", Internet, (Jan. 13, 2016), URL: https://en.wikipedia.org/w/index.php?title=Behavior_tree_(artificial_intelligence,_robotics_and_control)&oldid=699680860, (Aug. 23, 2016), XP002761048 [X] 1-15.
Champandard Alex J. et al, "The Behaviour Tree Starter Kit", Game AI Pro Collected Wisdom of Game AI Professionals, (2014), pp. 73-91, URL: http://file.allitebooks.com/20150721/Game%20AI%20Pro-%20Collected%20Wisdom%20of%20Game%20AI%20Professionals.pdf, (Aug. 24, 2016), XP002761049 [A] 1-15, p. 73-p. 91.
Korean Office Action dated Oct. 26, 2020, issued to corresponding Korean Patent Application No. 10-2018-7028713.
Decision of Refusal dated Dec. 20, 2019, issued by the Japanese Patent Office in corresponding application JP 2018-541426.
Chinese Office Action dated Aug. 3, 2020, issued by the National Intellectual Property Administration in corresponding application CN 201780014356.2.
Alejandro Marzinotto et al., "Towards a Unified Behavior Trees Framework for Robot Control", May 31-Jun. 7, 2014, pp. 5420-5427.
Notice of Reasons for Refusal dated Aug. 22, 2019, issued by the Japanese Patent Office in corresponding application JP 2018-541426.

* cited by examiner

CONTROLLING PROCESS OF ROBOTS HAVING A BEHAVIOR TREE ARCHITECTURE

CROSS-REFERENCE TO RELATED APPLICATIONS

This application is a national stage of International Application No. PCT/EP2017/054389, filed Feb. 24, 2017, which claims the benefit of priority European Application No. 16158565.8, filed Mar. 3, 2016, in the European Patent Office, the disclosures of which are incorporated herein by reference. The present invention relates to a method for controlling a robot, the method including usage of a behavior tree architecture for tasks performed by the robot. The present invention also relates to a system comprising a data processing means adapted to carry out the method, wherein the system preferably comprises a robot. The present invention also relates to a use of a behavior tree architecture for programming, supervision, introspection and/or debugging.

The present invention is directed to controlling robots. Furthermore, the present invention is directed to robots.

Robots are increasingly used in different industries and for different purposes. Recently, robots are increasingly used in environments where the robots do not only fulfill simple tasks, but fulfill more versatile tasks and have to "make decisions", e.g. react to influences from the environment beyond the mere adaptation of parameters.

In light of the above, it is an object of the present invention to provide an improved routine for the decision making process in a robot. Furthermore, it is also an object of the present invention to provide a robot equipped with an improved routine for the decision making process.

This object is fulfilled by the robot and the usage of the routine of the present invention.

According to a first aspect, a behavior tree process architecture is used to control a robot. According to a second aspect, a robot is provided, which robot is controlled by a process having a behavior tree architecture. According to a third aspect, a use of such a behavior tree architecture for programming, supervision, introspection and/or debugging is provided.

A behavior tree is a means for describing complex robot behavior as a composition of modular sub-actions. For example, the task of fetching an object can be described as a sequence of sub-actions for navigating towards the object, detecting it using a camera, picking it up using a gripper, and bringing it to the requested location. The behavior tree describes the 'control flow', i.e. in which order and under which conditions these sub-actions are to be executed.

Behavior trees comprise three kinds of nodes: a root node, control flow nodes, and execution nodes corresponding to the aforementioned sub-actions. These nodes are connected using directed edges. The node with outgoing edge is called "parent", the node with an incoming edge is called "child". Each node has at most one parent node and zero or more child nodes. The root node has no parent and a single child. Each control flow node has one parent and at least one child, and each execution node has one parent and no child. There are two types of control flow nodes: 'composite tasks', which can have multiple child tasks, and 'decorators' that wrap a single child task. The execution nodes may also be called the "leaves" of the behavior tree.

Typically, each node implements one method (e.g. called 'run( )') for executing the corresponding task that sets a node-internal execution state to the value RUNNING, SUCCESS, or FAILURE. The execution nodes update their status based on the result of the sub-action they perform; the control flow nodes update their status based on the status of their children. Tasks are in status SUCCESS if they have been successfully completed, in status FAILURE if they could not be completed, and in status RUNNING if they are still ongoing. In the following, we use the verbs "to succeed" as equivalent to "assuming the status SUCCESS", and "to fail" as equivalent to "assuming the status FAILURE". The present technology also envisages the usage of additional statuses or states.

The tree may normally be traversed with a fixed frequency (e.g. 10 Hz) in a depth-first manner, starting from the root node. This periodic re-evaluation facilitates the implementation of reactive behavior. The root node and control flow nodes trigger the execution of their child nodes, usually starting with the first one, by calling the 'run( )' method, and update their own execution status depending on the execution status of their children. Depending on the execution result, they may trigger the execution of another child, e.g. to sequentially execute all children after another.

The connections between the nodes in the behavior tree specify the control flow, i.e. the order in which the tasks are to be performed. In addition, the proposed method includes functionality for passing data between tasks (the so-called "data flow"). For example, one task might detect an object and compute its position and pass this data to the next task that will try to grasp that object. While these data need to be shared among a selection of tasks, they should not be available globally to avoid conflicts such as identical names used by different tasks. The proposed method introduces data elements that can be accessed by a name and that can hold data of arbitrary structure. These data elements can only be directly accessed by tasks in a sub-tree. If other tasks shall access these elements, the connection has to be explicitly specified.

Tasks need to define which data elements will serve as their input and output. Only data elements specified as input can be read in the task's run( ) method, and only data elements that are specified as output can be written to. Composite tasks possess an internal storage for data elements. When accessed, they create an internal copy of their parent's data elements, and once finished, they write the values of their output data elements to their parent's data storage. Children of a composite task can use additional entries for communication among themselves that are not externally visible.

This creates nested scopes of storage elements. Data elements can be made available outside of a subtree by adding them to the list of output elements of the respective composite task; otherwise, it will be encapsulated by this composite and will not interfere with other data elements of the same name in other parts of the tree.

The names of input and output data elements can be remapped, i.e. a data element of a task can be linked to a data element of a different name in the storage of the parent task. This allows to use multiple tasks of the same type in a composite without conflicts between identically named data elements.

The basic model of the three task states RUNNING, SUCCESS and FAILURE can be extended in order to model a node's lifecycle that includes initialization, suspension and termination of tasks. Each state transition can be linked to an event handler that performs required actions, for example to put the robot into a safe (motionless) state before suspending task execution. This is especially important when controlling robots in which programs cannot simply be paused or switched without considering the robot state and the action's effects in the outer world.

In the proposed method, nodes may be created with state INVALID. When they are first reached by the BT execution, the initialization routine is called and they transition to either RUNNING (if the initialization succeeded) or FAILURE (if the initialization failed). While the task runs, it remains in state RUNNING and will normally transition to one of the two terminal states SUCCESS or FAILURE once it has been finished. A behavior tree can be suspended externally by calling the suspend( )method on any task, leading to the suspension of the task and all its children. Suspended tasks are automatically resumed up once their run( ) method is called again.

Below, different types of nodes are described. The present technology may make use of each and any of the nodes described below.

1. Root Node

The root node "ticks" its child with a certain frequency, i.e. it executes the child and updates its own status based on the result.

2. Execution Nodes

There are two types of execution nodes, action nodes and condition nodes.

The condition nodes check a certain condition and return SUCCESS or FAILURE to its parent. E.g., in case the robot is an autonomously driving robot, one possible condition node may be whether an obstacle is present ("obstacle present") in the direction of where the robot is going. In case such an obstacle is sensed, it would return SUCCESS to its parent. In case such an obstacle is not sensed, it would return FAILURE to its parent.

The action nodes perform a certain action. If the robot is an autonomously driving robot with a motor (as exemplified above), one exemplary action may be stopping the motor ("motor stop"). The node will return RUNNING to its parent when the action of stopping the motor is still ongoing. It will return SUCCESS to its parent if the motor is stopped, and FAILURE if stopping the motor fails.

3. Control Flow Nodes

The control flow nodes are intermediate nodes between the root node and the execution nodes that effectively compose the robot behavior from the action and condition nodes. It is sometimes distinguished between "composite tasks" that can have more than one child, and "decorator tasks" that only have a single child. Examples of different control flow nodes are described below.

3.1 Sequence

Sequences call their children one after another as long as they succeed, always starting with the first child. In a typical use case, the children might be sub-actions that all need to be performed to achieve a composite task. If one action fails, the sequence also returns FAILURE to its parent and does not execute any further children. If all children succeed, the sequence succeeds as well. The sequence returns RUNNING when a ticked child returns RUNNING.

Execution Semantics:
Children are called one after another, always starting from the first child
When a child succeeds, continue with the next child
When a child fails, the sequence fails as well
When all children succeed, the Sequence succeeds 3.2 Selector Selector nodes try each of their children one after the other until one returns SUCCESS, always starting with the first child. In a typical use case, the children might be alternative ways to achieve a goal. If a ticked child returns RUNNING, the selector node also returns RUNNING. If one child returns SUCCESS, the selector succeeds as well and does not execute any further children. If all children fail, the selector also returns FAILURE. The selector composite can be used to rank tasks by their priority, with the first child having the highest priority. If each task checks its applicability conditions first, higher-priority tasks will automatically become active at the next iteration and may override or cancel actions started by lower-priority tasks.

Execution Semantics:
Children are called one after another, always starting from the first child
If one child succeeds, the selector succeeds as well and does not execute any further children.
When one child fails, continue with the next one.
If all children fail, the selector fails as well.

3.3 MemorySequence

As the Sequence node with the following adaptation. The MemorySequence node remembers the last running child and jumps back to it in the next tick, i.e. it does not start the execution of its children with the first child.

Execution Semantics:
Children are called one after another, starting from the child that has been running in the previous iteration
When a child succeeds, continue with the next child
When a child fails, the sequence fails as well
When all children succeed, the MemorySequence succeeds 3.4 MemorySelector As the Selector node with the following adaptation: The MemorySelector node remembers the last running child and jumps back to it in the next tick, i.e. it does not start the execution of its children with the first child.

Execution Semantics:
Children are called one after another, starting from the child that has been running in the previous iteration
If one child succeeds, the selector succeeds as well and does not execute any further children.
When one child fails, continue with the next one.
If all children fail, the selector fails as well.

3.5 Parallel Nodes

There are different types of nodes to describe the execution of children in parallel.

3.5.1 ParallelOne

The ParallelOne node executes all children in parallel. It fails if one fails and succeeds as soon as one child succeeds. A typical application may be to run a monitoring task in parallel to the main task that will keep running while the monitored condition remains true and return failure once it is not.

Execution Semantics:
All children are started in parallel
If one child fails, fail as well
If one child succeeds, succeed as well 3.5.2 ParallelAll The ParallelAll node executes all children in parallel. It fails if one fails and succeeds when all children succeed. A typical application may be to perform two motions simultaneously and to wait for all of them to complete.

Execution Semantics:
All children are started in parallel
If one child fails, fail as well
If some children succeed and some are still running, keep on running
If all children succeed, succeed as well

3.5.3 ParalellSelector

The ParallelSelector node executes all children in parallel. It fails if all fail and succeeds if one succeeds. A typical application is to try alternative options for solving a problem in parallel until one of them succeeds.

Execution Semantics:
All children are started in parallel
If one child succeeds, succeed as well
If some children failed and some are still running, keep on running
If all children fail, fail as well

3.6 Recovery

A Recovery task executes the first child as main task and will try the other children one after the other to recover from failures in the main task. If the first child succeeds, the Recovery task succeeds as well and does not execute any other children. If the first child fails, it continues with the other children until one of them succeeds. In this case, it continues with the first child. If all children fail, the recovery task fails as well. Being able to compactly implement this kind of recovery behavior is advantageous when using behavior trees for controlling physical robots that operate in complex and uncertain environments. In these cases, actions may often fail and routines for recovering from failures may account for large parts of a robot's control program.

Execution Semantics:
Execute the first child. If it succeeds, succeed as well and do not touch the other children
If the first child fails, continue with the other children
If any of the other children succeeds, continue with the first child
If any of the other children fails, try the next one
If all children fail, the recovery task fails as well

3.7 CheckSystemError

This composite node checks whether any unacknowledged system errors have been recorded. System errors are errors that put sub-systems of the robot into an unusable state, such as a motor failure or a broken sensor. Some of these errors may be resolved programmatically, e.g by re-starting a driver program, while others require human intervention. In both cases, the robot should stop trying to use any of the affected components until the error has been acknowledged. The CheckSystemError composite blocks if any unacknowledged system errors exist that affect at least one of the subsystems of the robot passed as parameter to this node. If no error exists, the first child is executed. If an error exists, the node tries to resolve the error by trying the other children one after another. It continues with the execution of child 1 if the error could be resolved by one of the children (i.e. if it returned SUCCESS), and fails otherwise.

Execution Semantics:
Execute the first child. Succeed and fail if the child succeeds and fails, respectively
If a system error is recorded during execution of the first child, stop execution of the first child and try the following children in order to see whether any of them resolves the error
If any of the other children succeeds, continue with the first child
If all children fail, the CheckSystemError task fails as well

3.8 Decorator Nodes

Decorator nodes have a single child and modify the returned value. That is, they "wrap" the single child return value. This modification of the returned value can be applied in various use cases, e.g. for executing tasks more than once, for conditioning the execution or for coordinating tasks.

3.8.1 Inverter

This node returns the opposite of its child's return value, i.e. SUCCESS when the child returns FAILURE, FAILURE when the child returns SUCCESS and RUNNING when the child returns RUNNING. It allows e.g. to check the opposite of a condition without defining a new condition node.

3.8.2 IgnoreFailure

This node returns SUCCESS when its child returns SUCCESS or FAILURE; RUNNING when its child returns RUNNING.

Execution Semantics:
When the child succeeds or fails, return SUCCESS
When the child is still running, return RUNNING

3.8.3 Loop

This node executes its child in a loop up to a (possibly unlimited) number of times (num_iterations) as long as it succeeds. It succeeds if the child has succeeded every time, and fails if the child fails once.

Execution Semantics:
Execute the child
If the child fails, fail as well
If the child succeeds, repeat until num_iterations has been reached and succeed, or repeat infinitely if num_iterations=−1.

3.8.4 LoopUntil

This node executes its child in a loop up to a given (possibly unlimited) maximum number of iterations (max_num_iterations) as long as it succeeds. The LoopUntil node succeeds if the child succeeds and if a success flag (task_done) has been set to True by the child. It fails if the child fails or if the maximum number of iterations has been reached without the success flag set to True.

Execution Semantics:
Execute the child
If the child fails, fail as well
If the child succeeds, repeat until the child sets the task_done value to True (then succeed) or until the max_num_iterations threshold has been reached (then fail and set the max_iterations_exceeded output to True)

3.8.5 Retry

The Retry decorator executes its child until it returns success. If the child succeeds, the Retry node succeeds as well. If the child fails, the node will re-start the child up to a given (possibly unlimited) number of times (max_iterations), and fails if the child fails more often than this threshold.

Execution Semantics:
Execute the child
If the child succeeds, succeed as well
If the child fails, retry up to max_iterations times
If the child fails more than max_iterations times, return FAILURE

3.8.6 ResultIterator

The ResultIterator iterates over all elements of a list returned by its child and returns them one by one. For example, the child may return a list of waypoints to be visited in order. The list returned by the child may be cached, in which case the child would only be called if no cached values are available. If the child fails, the node fails as well. If the child succeeds and returns a value, or if a cached value can be used, the node succeeds.

Execution Semantics:
The child is executed and returns a list via one of its output keys mapped to the list input of this decorator The decorator caches the list if the cache parameter is True The decorator returns the first element of the list via the item output If caching is True, subsequent calls will return the remaining elements of the cached list If caching is false or if the list has been exhausted, the child is called again to obtain a new list The execution value of the child is passed without modification, or SUCCESS is returned if a cached value is used 3.8.7 SubtreeLookup.

This decorator does not modify its child's return values, but serves for extending the behavior tree at runtime. When accessed, it loads a subtree from a storage device and adds it as children of itself. This is e.g. useful for storing modular and reusable tree fragments that can be instantiated in different (parts of different) trees. This is a common use case in robotics, where behavior, such as navigation or object manipulation appear in different parts of a task.

3.8.8 Failed

The Failed decorator returns SUCCESS in case the child has returned FAILURE and fails otherwise.

Execution Semantics:

Succeed if the child has returned FAILURE

Fail if the child has returned SUCCESS or is still RUNNING 3.8.9 Succeeded

The Succeeded decorator returns SUCCESS in case the child has returned SUCCESS and fails otherwise.

Execution Semantics:

Succeed if the child has returned SUCCESS

Fail if the child has returned FAILURE or is still RUNNING

That is, in simple words, the present technology relates to a method for controlling a robot, the method including usage of a behavior tree architecture for tasks performed by the robot.

In known robots, typically, finite state machines are used to control the robot. While this may be appropriate for industrial robots fulfilling simple and a limited number of clearly defined tasks (such as mounting a particular component to a vehicle), this is not ideal for robots that need to react to their surroundings. The present technology is particularly useful for robots in such environments, where the robots need to react to their surroundings and to a (potentially unlimited) number of different circumstances.

That is, the present technology equips the robot with different behaviors of how to react and how to prioritize the robot's reactions in different situations. The use of such a behavior tree architecture for controlling the robot may be advantageous for a plurality of reasons: Its structure may be simpler and require less storage space than would be necessary if the control method was implemented, e.g., as a finite state machine. Its graphical representation may be simpler and more intuitive for the user implementing the robot's behavior. In particular, the prioritization of tasks may be simplified. This may lead to the control robot being less prone to human errors when the behavior is implemented and therefore being more failsafe and increasing the overall safety of a robot being controlled by the method of the present technology. New tasks may be implemented into the method in a simpler and more flexible way, as the behavior tree architecture is very modular and flexible, thereby reducing the time required for new tasks to be added to the robot's behavior.

The method may be a computer implemented method. That is, a behavior tree architecture is used to prioritize the tasks performed by the robot.

Whenever method steps are mentioned in a particular order herein, the steps are preferably, but not necessarily performed in the order mentioned herein, unless specifically mentioned herein or unless clear to the skilled person.

The behavior tree architecture may comprise nodes including a root node, at least one control flow node and at least one execution node and directed edges, wherein the nodes are connected with the directed edges, wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge, wherein the control flow nodes and the execution nodes are adapted to return different states to their parents nodes, the states including success, running and failure, and the method may include the steps of the root node calling a control flow node; the control flow node calling a first node; the first node returning a first state to the control flow node; and the control flow node returning a second state to the root node.

As will be appreciated, the first and second states may be equal to or different from one another.

The method may further comprise defining a local node variable for a single node.

The local node variable may be passed from one node to another.

The behavior tree architecture may comprise sub trees, each sub tree comprising at least one control flow node and at least one execution node, and the method may further comprise defining a local sub tree variable for a sub tree.

The local sub tree variable may be passed from one sub tree to another.

The definition of such local node or local sub tree variables may be advantageous, as such definition are more flexible than the definition of global variables. Different fragments of the control method may be distributed in a task library, which may be used for other purposes and in different scenarios. Such local variables are also advantageous for the following reason: In the implementation of complex robotic behavior, different people may work on different sections of the robotic behavior, e.g., one person may implement a sub tree relating to the picking of an object and another person may implement a sub tree relating to a safety routine of the robot. It may be possible that both people implementing different sub trees define a variable having the same name (but relating to different aspects). By means of the local variables, this may not be problematic, as each variable is only defined for each sub tree. Otherwise, having the same variable defined for different sub trees (but relating to different aspects) may lead to errors in the robot's operation. Thus, the definition of local node variables or local sub tree variables may further improve the robot's behavior and may render this behavior more failsafe.

The states may further include at least one of initialized, suspended, invalid, aborted and preempted, wherein the state initialized indicates that a node has been initialized and is ready for execution, wherein the state suspended indicates that a node has been paused, wherein the state invalid indicates that a node has been created, but is not ready for execution yet, wherein the state aborted indicates that a node itself has stopped execution of this node, wherein the state preempted indicates that a user or a behavior tree executive has stopped the execution of the node, and wherein the method may further include one control flow node or execution node returning at least one of the states initialized, suspended, invalid, aborted and preempted.

For example, the state invalid may be assumed by a node when a node has not been initialized yet and connections to e.g. different components of the robot still have to be established.

For example, the state initialized may indicate that connections to a database or to other programs in a control system of a robot have been established.

The state suspended may indicate that a task is currently not executable, but its execution may be resumed at a later time.

For example, the state invalid may be assumed by a node when a node has not been initialized yet.

The state aborted may be assumed when during the execution of a node, an important or fatal error has been detected.

For example, a user may set a node to preempted in response to some external event.

That is, in addition to the states running, success, failure, additional states may be assumed by the nodes. Thus, nodes or sub-trees relating to tasks may have different "lifecycles", such that such structures can be stopped and resumed, e.g., depending on different (external) variables. The definition of such additional states may provide the user with the possibility of implanting a more versatile and therefore improved robotic behavior.

The states may include 2, 3, 4 or 5 of the states recited in the above paragraph.

The behavior tree architecture may comprises a variable control flow node connected to at least two outgoing edges with one child node connected to each edge, respectively, and the variable control flow node may call its child nodes according to rules, which rules also depend on aspects other than the states returned by the child nodes of the variable control flow node.

This may be different to other behavior tree architectures: e.g., in sequence and in the selector node, the rules for calling the children entirely depend on the children. That is, when knowing the states the children will return, it is known how the control flow node will react. With variable control flow nodes, this is different: even if knowing which states the children will return, it is not yet known how the variable control flow node will react. E.g., such a variable control flow node may call a child depending on other aspects (such as the system sensing a system error). Such a variable control flow node may be very convenient for controlling a robot, as the handling of errors and more generally the reaction to external influences is of some importance.

One child node of the variable control flow node may relate to a main task, which child node is defined as the main task child node, and another child node of the variable control flow node may relate to an optional task, which child is defined as the optional child node, wherein the variable control flow node calls the optional child node if a condition independent from the state of the main task child node is met.

The optional child node may be a repair child node and the variable control flow node may call the repair child node, when a repair is necessary.

The optional child node may be a safety child node and the variable control flow node may call the safety child node, when a safety-critical situation is detected.

The behavior tree architecture may comprise a heterogeneous control flow node connected to at least 3 outgoing edges with one child node connected to each edge, the child nodes comprising a starter child node and at least 2 non-starter child nodes, wherein the heterogeneous control flow node is adapted to call its child nodes consecutively starting with the starter child node, wherein the heterogeneous control flow node calls its children according to rules, wherein for each non-starter child node, the rules for calling the non-starter child node depend on the state of the child node called immediately before the respective non-starter child node, wherein this dependency is different for at least two non-starter child nodes.

That may be a distinction to other nodes, where the same rules are applied to all children (except the last one, when no further children exist). In the present technology, in simple words, different rules may be applied to some of the children. This may be a further difference to other nodes. E.g., in the sequence or selector node, the rules for calling the child node n, where n≥2, depend on the return of child node n−1. E.g., in the sequence node, child n is called when child n−1 succeeded (independent on n, where n≥2) and in the selector node, child n is called when child n−1 failed (independent on n, where n≥2). This is different for the heterogeneous control flow node that treats its children differently. For example, child 2 may be called when child 1 has succeeded, but child 3 may be called when child 2 failed. This may allow the implementation of more versatile and complex tasks in a simple an intuitive manner.

At least one control flow node may be realized as a recovery node, which recovery node has a plurality of child nodes comprising a first child node and at least one further child node, wherein the recovery node calls the first child node, and if the first child node returns success, the recovery node returns success and does not call the at least one further child node; if the first child node returns failure, the recovery node calls the at least one further child node; if one of the at least one further child nodes returns success, the recovery node calls the first node; if all of the at least one further child nodes return failure, the recovery node returns failure; and wherein the method may include executing the recovery node.

Such a recovery node may be particularly useful when having a main task that needs to be performed and different conditions that may impart performing of the main task. In such a situation, the method first tries to perform the main task. If this is undoable, additional auxiliary tasks may be performed in an attempt to alter the conditions that impart performing of the main task. One example for such a recovery node is that the main task is a robot grasping an object and an auxiliary task may be the position of the robot's base. First, the robot tries to grasp the object (main task). This may be undoable, e.g., as the base is in a wrong position, such that a robot arm cannot reach the object. As an auxiliary task, the robot may then reposition its base (auxiliary task). Once this has been successful, the task of grasping the object (main task) may be re-executed.

The behavior tree architecture may comprise a sub tree relating to sensing for a human in the surrounding of the robot and stopping the robot if a human is sensed in the surrounding of the robot and the method may execute this sub tree.

The behavior tree architecture may comprise a sub tree relating to selecting an object, picking up the object and bringing the object to a desired location and the method may execute this sub tree.

The behavior tree architecture may comprise a sub tree relating to the robot checking its battery status, the robot navigating to a charge station and the robot being charged and wherein the method may execute this sub tree.

The robot may be an autonomous robot.

The robot may include a mobile base and/or a manipulator.

The robot may be an autonomously driving robot.

The robot may be adapted to pick up objects.

The robot may include a sensor and the method may include sensing information by means of the sensor and effecting the robot to respond to the information.

The method may be a computer-implemented method.

Commands relating to the at least one control flow node and to the at least one execution node may be implemented as executable functions in a computer source code, wherein the nodes and the directed edges connecting the nodes define a tree structure, wherein the tree structure is stored as a data file, and the method may comprise sending said commands implemented as executable functions, said tree structure stored as a data file and an execution command to a behavior tree executive at runtime, and the behavior tree executive generating a control program based on said commands implemented as executable functions, said tree structure stored as a data file and the execution command at runtime.

It is preferred that the tree structure is a data file (e.g. in binary data format) and not an executable program file, and that a program may be generated based on that data. This allows data to be manipulated, generated, visualized, transmitted, etc. by software. It would be more difficult to do this with compiled program code that is difficult to interpret from within a program.

The data file may be a text file and preferably, a JSON format text file.

In other words, the behavior tree architecture may be implemented as a data structure and the executable tree may be instantiated at runtime based on said data structure and the executable functions in source code. A so defined specification may contain task parameters that are set at once when the tree is constructed and remain static afterwards. This may allow to create more generic task implementations because application-specific arguments can be defined as parameters in the tree specification, instead of being hard-coded in the task implementation. This may greatly increase the reusability and modularity of the components of the behavior tree.

The method may further comprise at least one of said nodes calling a watchdog routine, wherein the watchdog routine sets a timer, whenever the watchdog routine is called by the at least one of said nodes, and the timer elapses, when the watchdog routine is not called by the at least one of said nodes for a predefined time, wherein operation of the at least one of said nodes is stopped when the timer elapsed.

In other words, the watchdog routine is first started by the respective node registering it. The timer then starts a "count down". If the timer is not called again, it elapses and stops the operation of the respective node. However, during normal operation, the respective node re-calls (that is, it repetitively calls) the watchdog routine, such that the timer is reset and thereby prevented from elapsing and the node continues its operation. On the other hand, if the watchdog routine is not called for a predefined time (e.g., due to a system or program error or a hardware fault), the timer elapses and thereby stops operation of the node. The respective node then returns the state failure.

Such a watchdog routine or watchdog mechanism may be useful to ensure save behavior, when an action is interrupted and particularly when real hardware is used. One example is that a system error is reported and the operation of the behavior tree is stopped on a top level—the watchdog mechanism then ensures that the respective node that has started the watchdog only operates for a predefined time and is then stopped. That is, the watchdog mechanism is a routine contributing to safe operation, which is particularly useful for the operation of hardware. It may also allow to detect that a particular node is no longer called due to the operation of another node having a higher priority.

The present technology also relates to a robot comprising a data processing means adapted to carry out any of the methods recited above. More generally, the present technology relates to a system comprising data processing means adapted to carry out any of the methods recited herein.

The robot may be an autonomous robot.

The robot may include a mobile base and/or a manipulator.

The robot may be an autonomously driving robot.

The robot may be adapted to pick up objects.

The robot may include a sensor and the method includes sensing information by means of the sensor and effecting the robot to respond to the information.

The present technology also relates to a use of a behavior tree architecture for programming, supervision, introspection and/or debugging, wherein the behavior tree architecture comprises any of the features as set out above.

The usage of a behavior tree process architecture for controlling a robot may be beneficial for a plurality of reasons:

In comparison to approaches such as finite state machines that are commonly used for the control of robots, control programs specified as behavior tree may be much easier to adapt. Branches with new functionality can be integrated into a behavior tree by adding a single parent-child connection, while finite state machines require connections for all permitted task transitions.

The organization of a behavior tree into largely independent subtrees creates highly modular task specifications, increasing the re-usability of parts of the control program for different purposes. Variables are locally defined for "sub-trees" only, which is more flexible than having global variables defined. This may allow the distribution of individual program fragments in a task library that may be used for other purposes in other scenarios.

Behavior trees have a natural graphical representation that can be used for editing robot behavior without programming, for visualizing the resulting behavior specification, for inspecting the state of the control program at execution time, and for debugging behavior faults. The simplified visualization may also lead to fewer mistakes and decreased likelihood of false behavior of the robot.

In comparison to e.g. finite state machines commonly used for the control of robots, control programs described as behavior tree may be more reactive to events. This is because behavior trees evaluate with a fixed frequency which action to perform next given the situation at hand, which may be much more often than deciding at the end of an action which action to perform next, as it is the case for finite state machines.

Compared to e.g. finite state machines, the prioritization of tasks is much simpler and can be visualized in a very simple manner. Due to the improved and simplified prioritization of tasks, the overall performance of the robot may be improved—that is, the robot may first and reliably call the most important subroutines (e.g. the subroutines relating to safety measures).

Because of the modular structure and easy prioritization of subtrees, behavior trees allow to separately edit, store and execute code for nominal and exceptional behavior. This may lead to cleaner code for the nominal behavior that can focus on modeling the task itself without being interleaved with routines for handling exceptional cases. At the same time, the exception handling routines may be used for more than one tree. This may help to reuse both the nominal and exception-handling code separately in different scenarios.

The present technology is also defined by the following aspects:

1. A method for controlling a robot, the method including usage of a behavior tree architecture for tasks performed by the robot.
2. A method in accordance with the preceding aspect, wherein the behavior tree architecture comprises nodes including a root node, at least one control flow node and at least one execution node and directed edges, wherein the nodes are connected with the directed edges, wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge,
wherein the control flow nodes and the execution nodes are adapted to return different states to their parents nodes, the states including success, running and failure, the method including the steps of
the root node calling a control flow node;
the control flow node calling a first node;
the first node returning a first state to the control flow node;
the control flow node returning a second state to the root node.
3. A method in accordance with the preceding aspect, wherein the method further comprises defining a local node variable for a single node.
4. A method in accordance with the preceding aspect, wherein the local node variable is passed from one node to another.
5. A method in accordance with any of the 3 preceding aspects, wherein the behavior tree architecture comprises sub trees, each sub tree comprising at least one control flow node and at least one execution node, wherein the method further comprises defining a local sub tree variable for a sub tree.
6. A method in accordance with the preceding aspect, wherein the local sub tree variable is passed from one sub tree to another.
7. A method in accordance with any of the 5 preceding aspect, wherein the states further include at least one of initialized, suspended, invalid, aborted and preempted, wherein the state initialized indicates that a node has been initialized and is ready for execution,
wherein the state suspended indicates that a node has been paused,
wherein the state invalid indicates that a node has been created, but is not ready for execution yet,
wherein the state aborted indicates that a node itself has stopped execution of this node,
wherein the state preempted indicates that a user or a behavior tree executive has stopped the execution of the node,
and wherein the method further includes one control flow node or execution node returning at least one of the states initialized, suspended, invalid, aborted and preempted.
8. A method in accordance with the preceding aspect, wherein the states include 2, 3, 4 or 5 of the states recited in the preceding aspect.
9. A method in accordance with any of the 7 preceding aspects, wherein the behavior tree architecture comprises a variable control flow node connected to at least two outgoing edges with one child node connected to each edge, respectively,
wherein the variable control flow node calls its child nodes according to rules, which rules also depend on aspects other than the states returned by the child nodes of the variable control flow node.
10. A method in accordance with the preceding aspect, wherein one child node of the variable control flow node relates to a main task, which child node is defined as the main task child node, and another child node of the variable control flow node relates to an optional task, which child is defined as the optional child node, wherein the variable control flow node calls the optional child node if a condition independent from the state of the main task child node is met.
11. A method in accordance with the preceding aspect, wherein the optional child node is a repair child node and the variable control flow node calls the repair child node, when a repair is necessary.
12. A method in accordance with the penultimate aspect, wherein the optional child node is a safety child node and the variable control flow node calls the safety child node, when a safety-critical situation is detected.
13. A method in accordance with any of the 11 preceding aspects, wherein the behavior tree architecture comprises a heterogeneous control flow node connected to at least 3 outgoing edges with one child node connected to each edge, the child nodes comprising a starter child node and at least 2 non-starter child nodes,
wherein the heterogeneous control flow node is adapted to call its child nodes consecutively starting with the starter child node,
wherein the heterogeneous control flow node calls its children according to rules, wherein for each non-starter child node, the rules for calling the non-starter child node depend on the state of the child node called immediately before the respective non-starter child node, wherein this dependency is different for at least two non-starter child nodes.
14. A method in accordance with any of the 12 preceding aspects, wherein at least one control flow node is realized as a recovery node, which recovery node has a plurality of child nodes comprising a first child node and at least one further child node, wherein
the recovery node calls the first child node, and
if the first child node returns success, the recovery node returns success and does not call the at least one further child node;
if the first child node returns failure, the recovery node calls the at least one further child node;
if one of the at least one further child nodes returns success, the recovery node calls the first node;
if all of the at least one further child nodes return failure, the recovery node returns failure;

and wherein the method includes executing the recovery node.

15. A method in accordance with any of the preceding aspects, wherein the behavior tree architecture comprises a sub tree relating to sensing for a human in the surrounding of the robot and stopping the robot if a human is sensed in the surrounding of the robot and wherein the method executes this sub tree.
16. A method in accordance with any of the preceding aspects, wherein the behavior tree architecture comprises a sub tree relating to selecting an object, picking up the object and bringing the object to a desired location and wherein the method executes this sub tree.
17. A method in accordance with any of the preceding aspects, wherein the behavior tree architecture comprises a sub tree relating to the robot checking its battery status, the robot navigating to a charge station and the robot being charged and wherein the method executes this sub tree.
18. A method in accordance with any of the preceding aspects, wherein the robot is an autonomous robot.
19. A method in accordance with any of the preceding aspects, wherein the robot includes a mobile base and/or a manipulator.
20. A method in accordance with any of the preceding aspects, wherein the robot is an autonomously driving robot.
21. A method in accordance with any of the preceding aspects, wherein the robot is adapted to pick up objects.
22. A method in accordance with any of the preceding aspects, wherein the robot includes a sensor and the method includes sensing information by means of the sensor and effecting the robot to respond to the information.
23. A method in accordance with any of the preceding aspects, wherein the method is a computer-implemented method.
24. A method in accordance with any of the preceding aspects with the features of aspect 2,
wherein commands relating to the at least one control flow node and to the at least one execution node are implemented as executable functions in a computer source code,
wherein the nodes and the directed edges connecting the nodes define a tree structure,
wherein the tree structure is stored as a data file,
wherein the method comprises
sending said commands implemented as executable functions, said tree structure stored as a data file and an execution command to a behavior tree executive at runtime,
the behavior tree executive generating a control program based on said commands implemented as executable functions, said tree structure stored as a data file and the execution command at runtime.
25. A method in accordance with the preceding aspect, wherein the data file is a text file and preferably, a JSON format text file.
26. A method in accordance with any of the preceding aspects with the features of aspect 2 and further comprising
at least one of said nodes calling a watchdog routine, the watchdog routine
setting a timer, whenever the watchdog routine is called by the at least one of said nodes, and
the timer elapsing, when the watchdog routine is not called by the at least one of said nodes for a predefined time,
wherein operation of the at least one of said nodes is stopped when the timer elapsed.
27. A system comprising data processing means adapted to carry out a method in accordance with any of the preceding aspects.

Below, further apparatus aspects will be discussed. These aspects are denoted by an "R" (for robot) followed by a number.

R1. A robot comprising a data processing means adapted to carry out the method recited in any of the preceding aspects.
R2. A robot in accordance with the preceding aspect, wherein the robot is an autonomous robot.
R3. A robot in accordance with any of the preceding apparatus aspects, wherein the robot includes a mobile base and/or a manipulator.
R4. A robot in accordance with any of the preceding apparatus aspects, wherein the robot is an autonomously driving robot.
R5. A robot in accordance with any of the preceding apparatus aspects, wherein the robot is adapted to pick up objects.
R6. A robot in accordance with any of the preceding apparatus aspects, wherein the robot includes a sensor.
U1. Use of a behavior tree architecture for programming, supervision, introspection and/or debugging, wherein the behavior tree architecture comprises any of the features as set out in above aspects.

Preferred embodiments of the present invention will now be described with reference to the accompanying drawings.

Figure 1:
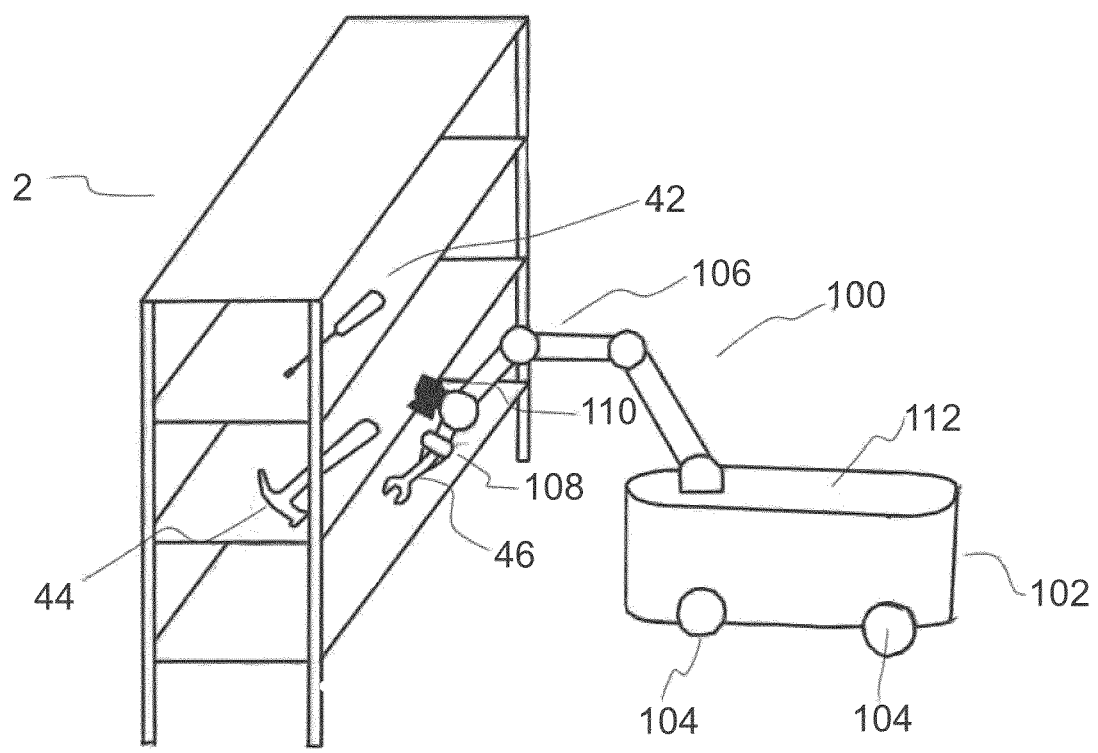
FIG. 1 depicts a robot and shelf storing a plurality of objects.

FIG. 1 depicts a robot 100 and a shelf 2. In the shelf 2, there are located a plurality of different objects, which are depicted as tools 42, 44, 46. In the depicted embodiment, there is depicted a screw driver 42, a hammer 44 and a wrench 46 located in the shelf 2. Furthermore, there is depicted a robot 100. The robot 100 comprises a base 102 including a plurality of wheels 104 (only two of which are depicted in FIG. 1) such that the robot 100 may drive. On the base 102, a pick-up means 106 is located. In the depicted embodiment, the pick-up means 106 is a grappler having one or more joints. At the end of pick-up means 106, there is provided a gripping tool 108 adapted to grip or pick up objects. Furthermore, at the end of the pick-up means 106, there is also provided a camera 110. On top of the base 102, there may be a space 112 to place objects, e.g. objects 42 to 46.

The robot 100 may be an autonomously driven and executed robot 100. The robot 100 may in particular be used in a warehouse to pick up goods, e.g. objects 42 to 46 and to bring the objects 42 to 46 to a desired location.

A typical usage of such a robot 100 will now be described. A user may desire the robot 100 to bring certain objects, e.g. a screw driver 42 and a wrench 46 to a desired location, e.g. a location where the objects may be packed for shipping. The user may communicate this information to the robot 100, e.g. by means of known communication standards, such a wireless LAN. The robot 100 may autonomously navigate to the shelf 2 where the respective objects are stored. To do so, there may be provided a memory storing the information about which object is stored in which shelf 2 of the warehouse. The robot 100 may navigate to the correct shelf 2 by means of its wheels 104. Once the robot 100 has reached the correct shelf 2, the robot 100 may locate the exact location of the objects (here: the screw driver 42 and the wrench 46) by means of the camera 110. The gripping tool 108 may then be extended by means of the pick-up means 106 to the correct location to pick up the wrench 46 (as depicted in FIG. 1). Once the gripping tool 108 has gripped the wrench 46, the pick-up means 106 may place the wrench 42 on space 112. Then, this gripping and placement procedure may be repeated for screw driver 42 to also place the screw driver 42 on the space 112.

Once the desired objects are placed on storage space 112, the robot 100 may navigate to the desired location, e.g. to the location for packing and/or shipping of the objects.

The robot 100 may be controlled by a particular process. This process controls the robot and prioritizes the different tasks the robot 100 may have to perform. For such an autonomously driving and operating robot 100, the different tasks to be performed and to be prioritized may be much more versatile than for simpler robots.

Figure 2:
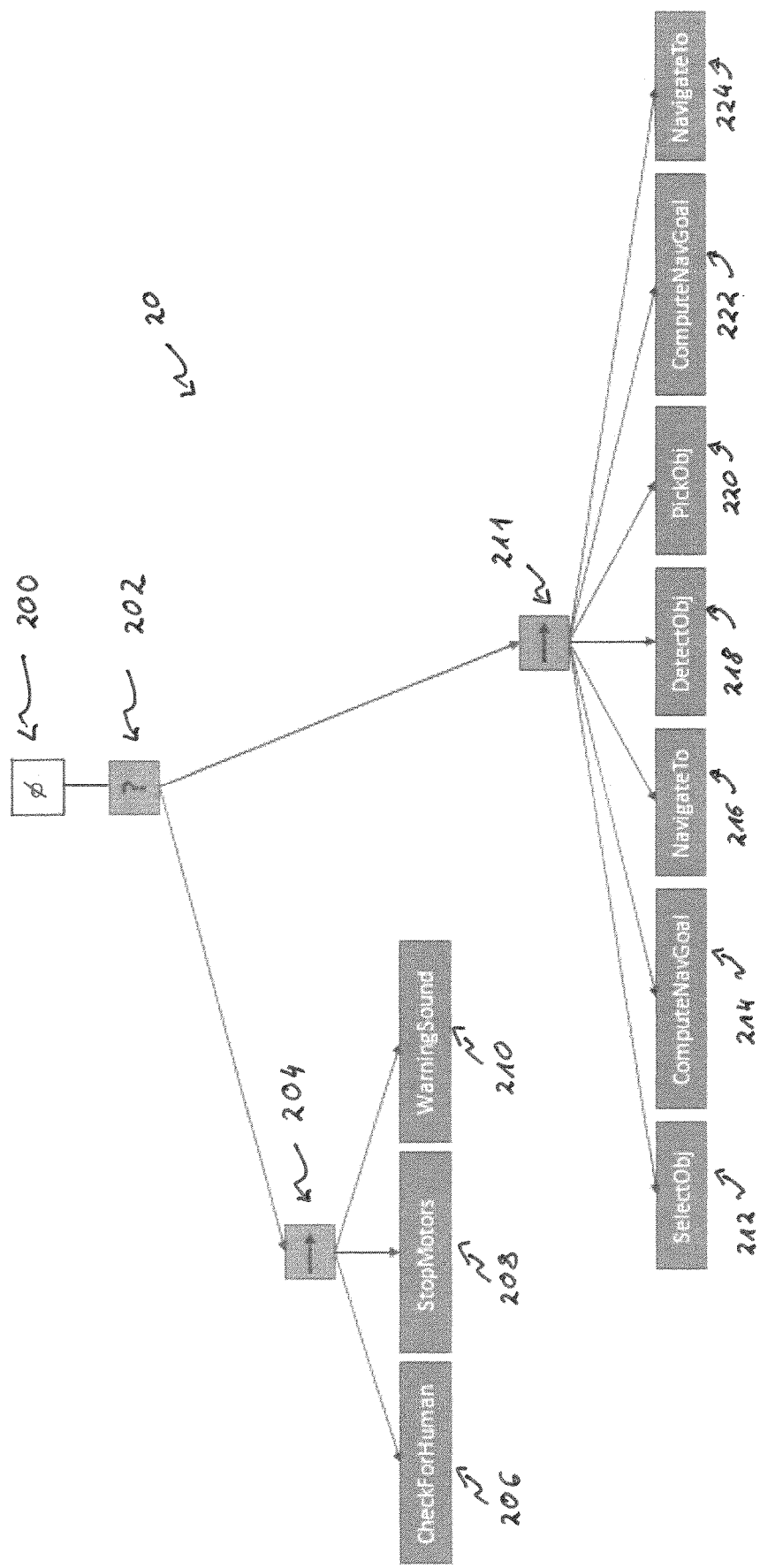
FIGS. 2 and 3 depict behavior trees used to control a robot.

For this control process, a behavior tree architecture 20 may be used. An exemplary behavior tree architecture is depicted in FIG. 2. At the top of the behavior tree, there is a root node 200, identified as a box with a "Ø". Root node 200 has no incoming node, but only one outgoing node 202. In the depicted embodiment, this node (i.e. the child of root node 200) is a selector node 202 generally identified by a box with a "?". Selector node 202 has two children 204 and 211, the latter of which will be described first.

Sequence node 211 (such nodes are generally identified by a box with a "→") and its children 212 to 224 include the general task to be carried out by robot 100, i.e. "to get and bring the object(s)" identified by the user. As discussed above, the sequence node 211 calls its children in a specific order (in the representation: from left to right). First, the node 212 "SelectObj" is called. This node may 212 check whether an object has been selected. If no object has been selected, node 212 returns FAILURE to its parent node 211, which terminates the sequence of node 211 and node 211 in turn returns FAILURE to its parent node 202.

If however, an object has been selected by a user in node 212, node 212 returns SUCCESS to its parent node 211. Parent node 211 then ticks the next child in the sequence, i.e. node 214. Node 214 is a subroutine for computing the navigation route to the selected object (e.g. the wrench 46). This may include further steps not depicted in FIG. 2 (e.g. retrieving the position of the wrench 46 in a data set; calculating the fastest route to this location, etc.). As long as the computation in node 214 is ongoing, it returns RUNNING to its parent node 211 (parent node 211 would then also return RUNNING to node 202). If node 214 finds that completion of its task is impossible (e.g. the selected object is not in the warehouse), it returns FAILURE to selector node 211. If the task is completed, i.e. the navigation route is computed, node 214 returns SUCCESS to its parent sequence node 211.

Node 211 calls its children in sequence. Without going into every last detail and possibility, once child 214 has been successful (i.e. the navigation route has been determined), child 216 is called navigating the robot to the location of the object. Once this task has been successful, the object is detected in node 218. Then, the object is picked up in node 220, (in the robot depicted in FIG. 1, the object could also be placed on storage space 112 in an additional sub routine), the navigation route to the desired location is computed in node 222 and the robot is then navigated to this desired location in node 224.

That is, the sequence node 211 and its children may represent the core functionality of a pick-up robot.

However, there may be other sub routines that need to be performed by the robot 100. One such sub-routine is depicted in FIG. 2 with sequence node 204 and its children 206 to 210. This sub-routine ensured that no harm is done to a human. Sequence node 204 first ticks node 206 checking whether or not a human is present (e.g. in the direction the robot 100 is going or alternatively within a predefined distance from robot 100). If this condition is met, node 206 returns SUCCESS to node 204. Node 204 then calls node 206 stopping the motor of the robot. Node 208 returns SUCCESS once the motor is stopped. Node 204 then calls node 210 triggering a warning sound. Once this warning sound has been provided, node 210 returns SUCCESS to node 204. In turn, node 204 returns SUCCESS to its parent node, i.e. selector node 202, which would then not call its child 211. The selector node 202 then also returns SUCCESS to its parent node, the root node 200. It is noted that the behavior tree structure 20 in FIG. 2 is for illustrative purpose only and may be somewhat simplified. In particular, some nodes may be omitted for clarity of illustration and description. For example, in between sequence node 204 and action node 208, there may be included an additional decorator node (not depicted), such as an Ignore Failure node or a Retry node to ensure that, when a human is detected in node 206, the motor is stopped and the routine only continues further when the motor is stopped in sequence 204. The same may apply to a potential additional node being present between sequence node 204 and action node 210 to ensure that a warning sound is always triggered upon detection of a human.

This example illustrates how different routines may be combined with one another. The routines are always called from left to right. Thus, it is very easy to implement routines with different priorities and visualize the respective priorities (here: safety routine 204 to 210 would have a higher priority than general task routine 211 to 224), which makes this architecture particularly efficient and fail-safe.

Figure 3:
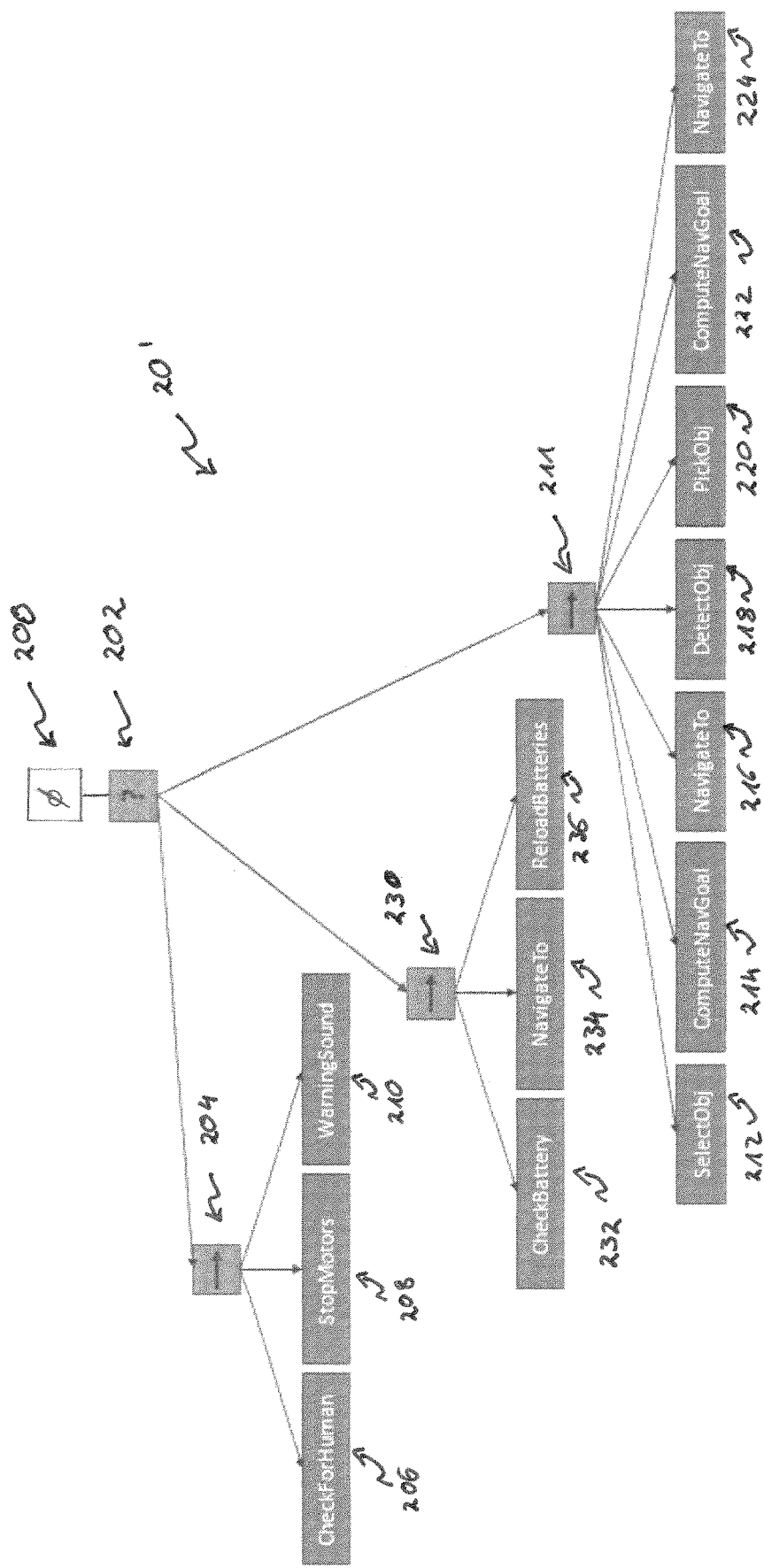

Furthermore, such a process for controlling the robot 100 may also be adapted easily, i.e. additional functionality may be added. This is visualized in FIG. 3 depicting an adapted control architecture 20'. Like features carry like reference numerals and will not be described in further detail below. Attention is drawn to the additional routine carrying reference numerals 230 to 236, which additional routine may be called battery safety routine. This routine includes a sequence node 230 having node 202 as the parent node. Furthermore, there are provided the nodes 232 to 236 as child nodes. Node 232 checks the battery, e.g. it may be checked whether the battery status is below a certain threshold. If this node fails (i.e. the batteries is not below the threshold), node 232 returns FAIL to node 230 and node 230 returns FAIL to selector node 202, which would then go on with sequence node 211. However, if the battery is below the threshold, node 232 succeeds and returns SUCCESS to node 230, which then calls node 234 navigating the robot to a loading station. Once this is achieved, node 234 returns SUCCESS to node 230, which then calls node 236 to reload the batteries.

With reference to FIG. 3, it becomes apparent that additional functionality may be implemented easily in such a behavior tree architecture. That is, the control architecture is highly flexible. Furthermore, the priorities of the different sub-routines are also clear from FIG. 3. The further left a sub-routine is located, the higher the priority.

While the present invention has been described with reference to particular embodiments, it is to be understood that these embodiments do not limit the scope of the invention, but merely serve to illustrate the invention.

The invention claimed is:

1. A method for controlling a robot, the method including using a behavior tree architecture for tasks performed by the robot,
  wherein the robot includes a mobile base and/or a manipulator,
  wherein the behavior tree architecture comprises nodes including a root node, at least one control flow node and at least one execution node and directed edges,
  wherein the nodes are connected with the directed edges,
  wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge,
  wherein the control flow nodes and the execution nodes are adapted to return different states to their parents nodes, the states including success, running and failure,
  the method including the steps of
    the root node calling a control flow node;
    the control flow node calling a first node;
    the first node returning a first state to the control flow node; and
    the control flow node returning a second state to the root node;
  wherein the at least one control flow node comprises a composite task with multiple child tasks, wherein the composite task defines which data elements serve as its input and output, and
  wherein, in addition to returning the states to its parent node, the composite task writes values of its output data elements to its parent's data storage.

2. The method in accordance with claim 1, wherein the behavior tree architecture comprises sub trees, each sub tree comprising at least one control flow node and at least one execution node, wherein the method further comprises defining a local sub tree variable for a sub tree.

3. The method in accordance with claim 2, wherein the local sub tree variable is passed from one sub tree to another.

4. The method in accordance with claim 1, wherein the states further include at least one of
  initialized, suspended, invalid, aborted and preempted,
  wherein the state initialized indicates that a node has been initialized and is ready for execution,
  wherein the state suspended indicates that a node has been paused,
  wherein the state invalid indicates that a node has been created, but is not ready for execution yet,
  wherein the state aborted indicates that a node itself has stopped execution of this node,
  wherein the state preempted indicates that a user or a behavior tree executive has stopped the execution of the node,
  and wherein the method further includes one control flow node or execution node returning at least one of the states initialized, suspended, invalid, aborted and preempted.

5. The method in accordance with claim 1, wherein the behavior tree architecture comprises a variable control flow node connected to at least two outgoing edges with one child node connected to each edge, respectively,
  wherein the variable control flow node calls its child nodes according to rules, which rules also depend on aspects other than the states returned by the child nodes of the variable control ow node.

6. The method in accordance with claim 5, wherein one child node of the variable control flow node relates to a main task, which child node is defined as the main task child node, and another child node of the variable control flow node relates to an optional task, which child is defined as the optional child node, wherein the variable control flow node calls the optional child node if a condition independent from the state of the main task child node is met.

7. The method in accordance with claim 1, wherein the behavior tree architecture comprises a heterogeneous control flow node connected to at least 3 outgoing edges with one child node connected to each edge, the child nodes comprising a starter child node and at least 2 non-starter child nodes,
  wherein the heterogeneous control flow node is adapted to call its child nodes consecutively starting with the starter child node,
  wherein the heterogeneous control flow node calls its children according to rules, wherein for each non-starter child node, the rules for calling the non-starter child node depend on the state of the child node called immediately before the respective non-starter child node, wherein this dependency is different for at least two non-starter child nodes.

8. The method in accordance with claim 1, wherein at least one control flow node is realized as a recovery node, which recovery node has a plurality of child nodes comprising a first child node and at least one further child node, wherein
  the recovery node calls the first child node, and
  if the first child node returns success, the recovery node returns success and does not call the at least one further child node;
    if the first child node returns failure, the recovery node calls the at least one further child node;
    if one of the at least one further child nodes returns success, the recovery node calls the first node;
    if all of the at least one further child nodes return failure, the recovery node returns failure; and
      wherein the method includes executing the recovery node.

9. The method in accordance with claim 1, wherein the behavior tree architecture comprises a sub tree relating to selecting an object, picking up the object and bringing the object to a desired location and wherein the method executes this sub tree.

10. The method in accordance with claim 1,
  wherein commands relating to the at least one control flow node and to the at least one execution node are implemented as executable functions in a computer source code,
  wherein the nodes and the directed edges connecting the nodes define a tree structure,
  wherein the tree structure is stored as a data file,
  wherein the method comprises
    sending said commands implemented as executable functions, said tree structure stored as a data file and an execution command to a behavior tree executive at runtime, and the behavior tree executive generating a control program based on said commands implemented as executable functions, said tree structure stored as a data file and the execution command at runtime.

11. A system comprising a data processor adapted to carry out the method according to claim 1.

12. The method of claim 1, wherein the behavior tree is used to control at least one of the following tasks: programming, supervision, introspection and debugging.

13. A method including controlling a robot and using a behavior tree architecture for tasks performed by the robot,
wherein the robot is an autonomously driving robot,
wherein the behavior tree architecture comprises nodes including a root node, at least one control flow node and at least one execution node and directed edges,
wherein the nodes are connected with the directed edges,
wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge,
wherein the control flow nodes and the execution nodes are adapted to return different states to their parents nodes, the states including success, running and failure,
the method including the steps of
the root node calling a control flow node;
the control flow node calling a first node;
the first node returning a first state to the control flow node; and
the control flow node returning a second state to the root node;
wherein the at least one control flow node comprises a composite task with multiple child tasks, wherein the composite task defines which data elements serve as its input and output, and
wherein, in addition to returning the states to its parent node, the composite task writes values of its output data elements to its parent's data storage.

14. A method including controlling a robot and using a behavior tree architecture for tasks performed by the robot,
wherein the robot includes a sensor and the method includes sensing information by means of the sensor and effecting the robot to respond to the information,
wherein the behavior tree architecture comprises nodes including a root node, at least one control flow node and at least one execution node and directed edges,
wherein the nodes are connected with the directed edges,
wherein the root node has one outgoing edge and no incoming edge, each control flow node has one incoming edge and at least one outgoing edge and each execution node has one incoming edge and no outgoing edge, wherein a node having an outgoing edge is defined as a parent node in relation to another node connected to this edge and a node having an incoming edge is defined as a child node in relation to another node connected to this edge,
wherein the control flow nodes and the execution nodes are adapted to return different states to their parents nodes, the states including success, running and failure,
the method including the steps of
the root node calling a control flow node;
the control flow node calling a first node;
the first node returning a first state to the control flow node; and
the control flow node returning a second state to the root node;
wherein the at least one control flow node comprises a composite task with multiple child tasks, wherein the composite task defines which data elements serve as its input and output, and
wherein, in addition to returning the states to its parent node the composite task writes values of its output data elements to its parent's data storage.

* * * * *